United States Patent
Hall, Jr. et al.

(10) Patent No.: US 7,431,460 B2
(45) Date of Patent: Oct. 7, 2008

(54) TWO-STAGE PROJECTOR ARCHITECTURE

(75) Inventors: Estill Thone Hall, Jr., Fishers, IN (US); Eugene Murphy O'Donnell, Fishers, IN (US); Valter Drazic, Betton (FR)

(73) Assignee: Thomson Licensing, Boulogne Billancourt (FR)

( * ) Notice: Subject to any disclaimer, the term of this patent is extended or adjusted under 35 U.S.C. 154(b) by 13 days.

(21) Appl. No.: 10/536,743

(22) PCT Filed: Nov. 26, 2003

(86) PCT No.: PCT/US03/37978

§ 371 (c)(1),
(2), (4) Date: May 27, 2005

(87) PCT Pub. No.: WO2004/051363

PCT Pub. Date: Jun. 17, 2004

(65) Prior Publication Data

US 2006/0158619 A1    Jul. 20, 2006

Related U.S. Application Data

(60) Provisional application No. 60/430,997, filed on Dec. 4, 2002, provisional application No. 60/430,819, filed on Dec. 4, 2002.

(51) Int. Cl.
   *G03B 21/14* (2006.01)
(52) U.S. Cl. .......................... 353/30; 353/94
(58) Field of Classification Search ............... 353/20, 353/31, 33, 34, 37, 94, 30; 349/5, 7, 8, 9; 348/742, 743, 744, 758
See application file for complete search history.

(56) References Cited

U.S. PATENT DOCUMENTS

| | | | | |
|---|---|---|---|---|
| 5,978,142 A | * | 11/1999 | Blackham et al. | 359/618 |
| 6,224,216 B1 | * | 5/2001 | Parker et al. | 353/31 |
| 6,234,634 B1 | * | 5/2001 | Hansen et al. | 353/20 |
| 6,304,302 B1 | | 10/2001 | Huang et al. | |
| 6,406,148 B1 | * | 6/2002 | Marshall et al. | 353/31 |
| 6,561,557 B2 | | 5/2003 | Choi | |
| 6,561,652 B1 | | 5/2003 | Kwok et al. | |
| 6,637,888 B1 | | 10/2003 | Haven | |

(Continued)

FOREIGN PATENT DOCUMENTS

EP    0829747    3/1998

(Continued)

OTHER PUBLICATIONS

Search Report Dated Jun. 9, 2004.

*Primary Examiner*—William C. Dowling
(74) *Attorney, Agent, or Firm*—Joseph J. Laks; Harvey D. Fried; Patricia Verlangieri (57) ABSTRACT

A light projection system projects an image comprising a matrix of light pixels having modulated luminance. The projection system includes a first imager configured to modulate a light band on a pixel-by-pixel basis proportional to gray scale values provided for each pixel of the image to provide a first output matrix. A second imager is positioned and configured to receive the first output matrix of modulated pixels of light and modulate the individual modulated pixels of light from said first imager on a pixel-by-pixel basis proportional to a second gray scale value provided for each pixel of the image.

6 Claims, 5 Drawing Sheets

U.S. PATENT DOCUMENTS

| | | |
|---|---|---|
| 6,643,069 B2 * | 11/2003 | Dewald ..................... 359/629 |
| 7,002,533 B2 * | 2/2006 | Sayag ......................... 345/7 |
| 2003/0103171 A1 | 6/2003 | Hall, Jr. et al. |
| 2005/0174495 A1 * | 8/2005 | Itoh et al. ................... 348/758 |

FOREIGN PATENT DOCUMENTS

| | | |
|---|---|---|
| WO | WO 01/69941 | 9/2001 |
| WO | WO 02/03687 | 1/2002 |
| WO | WO 02/069030 | 9/2002 |

* cited by examiner

TWO-STAGE PROJECTOR ARCHITECTURE

CROSS-REFERENCE TO RELATED APPLICATIONS

This application claims the benefit, under 35 U.S.C. § 365 of International Application PCT/US03/37978, filed Nov. 26, 2003, which was published in accordance with PCT Article 21(2) on Jun. 17, 2004 in English and which claims the benefit of U.S. provisional patent application Ser. No. 60/430,997, filed Dec. 4, 2002 and U.S. provisional patent application Ser. No. 60/430,819, filed Dec. 4, 2002.

FIELD OF THE INVENTION

The present invention relates to a display system having a two-stage projector architecture.

BACKGROUND

Liquid crystal displays (LCDs), and particularly liquid crystal on silicon (LCOS) systems using a reflective light engine or imager, are becoming increasingly prevalent in imaging devices such as rear projection television (RPTV). In an LCOS system, projected light is polarized by a polarizing beam splitter (PBS) and directed onto a LCOS imager or light engine comprising a matrix of pixels. Throughout this specification, and consistent with the practice of the relevant art, the term pixel is used to designate a small area or dot of an image, the corresponding portion of a light transmission, and the portion of an imager producing that light transmission.

Each pixel of the imager modulates the light incident on it according to a gray-scale factor input to the imager or light engine to form a matrix of discrete modulated light signals or pixels. The matrix of modulated light signals is reflected or output from the imager and directed to a system of projection lenses which project the modulated light onto a display screen, combining the pixels of light to form a viewable image. In this system, the gray-scale variation from pixel to pixel is limited by the number of bits used to process the image signal. The contrast ratio from bright state (i.e., maximum light) to dark state (minimum light) is limited by the leakage of light in the imager.

One of the major disadvantages of existing LCOS systems is the difficulty in reducing the amount of light in the dark state, and the resulting difficulty in providing outstanding contrast ratios. This is, in part, due to the leakage of light, inherent in LCOS systems.

In addition, since the input is a fixed number of bits (e.g., 8, 10, etc.), which must describe the full scale of light, there tend to be very few bits available to describe subtle differences in darker areas of the picture. This can lead to contouring artifacts.

One approach to enhance contrast in LCOS in the dark state is to use a COLORSWITCH™ or similar device to scale the entire picture based upon the maximum value in that particular frame. This improves some pictures, but does little for pictures that contain high and low light levels. Other attempts to solve the problem have been directed to making better imagers, etc. but these are at best incremental improvements.

What is needed is a projection system that enhances the contrast ratio for video images, particularly in the dark state, and reduces contouring artifacts.

SUMMARY

The present invention provides a projection system that provides improved contrast and contouring of a light signal on a pixel-by-pixel basis using a two-stage projection architecture, thus improving all video pictures. In an exemplary embodiment of the present invention, this projection system includes a first imager configured to modulate a light band on a pixel-by-pixel basis proportional to gray scale values provided for each pixel of the image to provide a first output matrix. A second imager is positioned and configured to receive the first output matrix of modulated pixels of light and modulate the individual modulated pixels of light from said first imager on a pixel-by-pixel basis proportional to a second gray scale value provided for each pixel of the image. Each pixel of the second imager provides a light output of intensity proportional to a modulated light output of a corresponding pixel in the first imager and a selected gray scale value for that pixel in the second imager.

BRIEF DESCRIPTION OF THE DRAWINGS

The invention will now be described with reference to accompanying figures of which.

DETAILED DESCRIPTION OF THE PREFERRED EMBODIMENT

The present invention provides a projection system, such as for a television display, with enhanced contrast ratio and reduced contouring. In an exemplary LCOS system, illustrated in FIG. 1, white light 1 is generated by a lamp 10. Lamp 10 may be any lamp suitable for use in an LCOS system. For example a short-arc mercury lamp may be used. The white light 1 enters an integrator 20, which directs a telecentric beam of white light 1 toward the projection system 30. The white light 1 is then separated into its component red, green, and blue (RGB) bands of light 2. The RGB light 2 may be separated by dichroic mirrors (not shown) and directed into separate red, green, and blue projection systems 30 for modulation. The modulated RGB light 2 is then recombined by a prism assembly (not shown) and projected by a projection lens assembly 40 onto a display screen (not shown).

Figure 1:
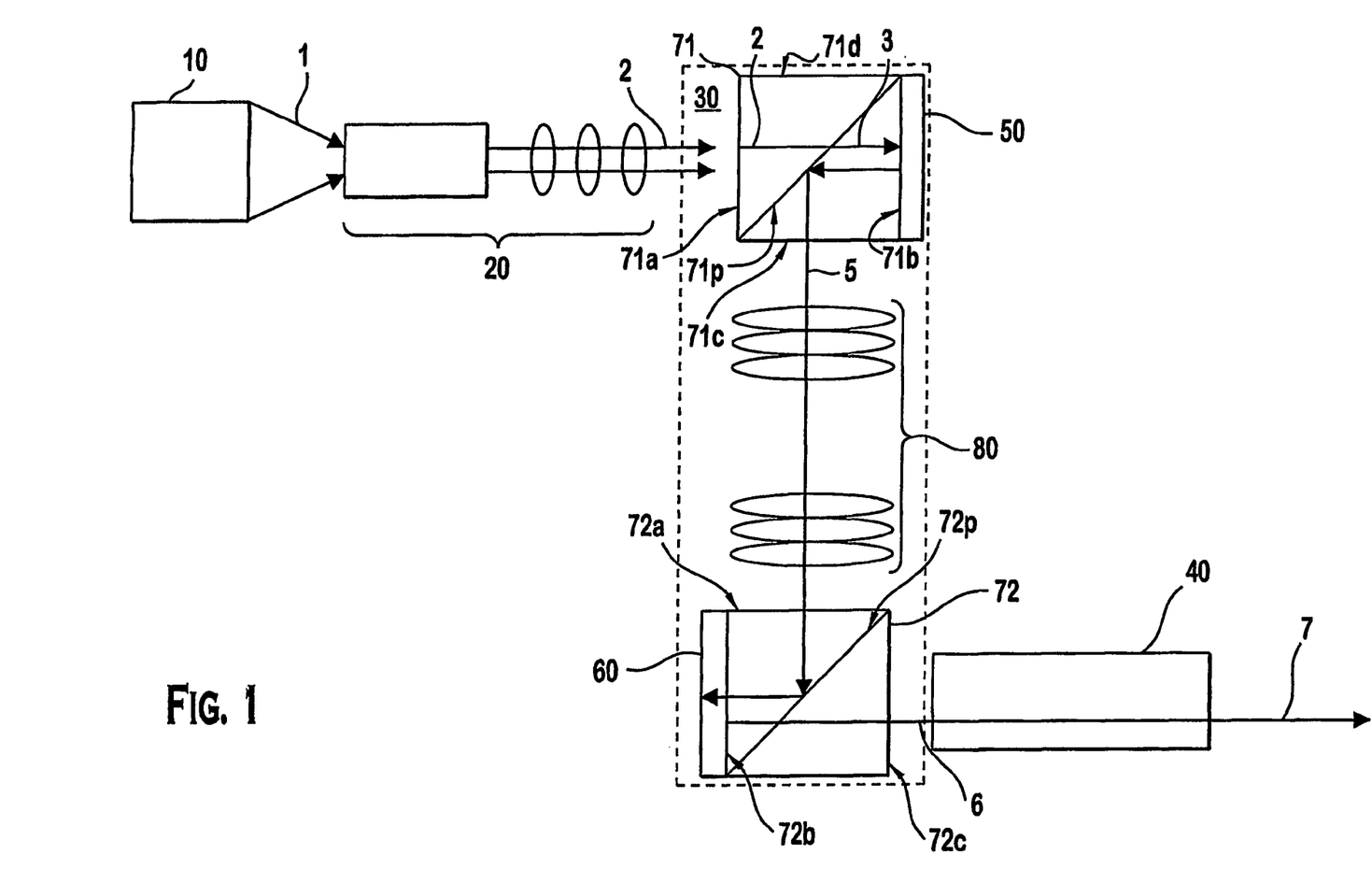
FIG. 1 shows a block diagram of an LCOS projection system with a two-stage projection architecture according to an exemplary embodiment of the present invention.

Alternatively, the white light 1 may be separated into RGB bands of light 2 in the time domain, for example, by a color wheel (not shown), and thus directed one-at-a-time into a single LCOS projection system 30.

An exemplary LCOS projection system 30 is illustrated in FIG. 1, using a two-stage projection architecture according to the present invention. The monochromatic RGB bands of light 2 are sequentially modulated by two different imagers 50, 60 on a pixel-by-pixel basis. The RGB bands of light 2 comprise a p-polarized component 3 and an s-polarized component 4 (shown in FIG. 3). These RGB bands of light 2 enter a first surface 71a of a first PBS 71 and are polarized by a polarizing surface 71p within the first PBS 71. The polarizing surface 71p allows the p-polarized component 3 of the RGB bands of light 2 to pass through the first PBS 71 to a second surface 71b, while reflecting the s-polarized component at an angle, away from the projection path where it passes out of first PBS 71 through fourth surface 71d. A first imager 50 is disposed beyond the second surface 71b of the first PBS 71 opposite the first face 71a, where the RGB bands of light enter first PBS 71. The p-polarized component 3, which passes through the PBS 71, is therefore incident on the first imager 50.

Figure 2:
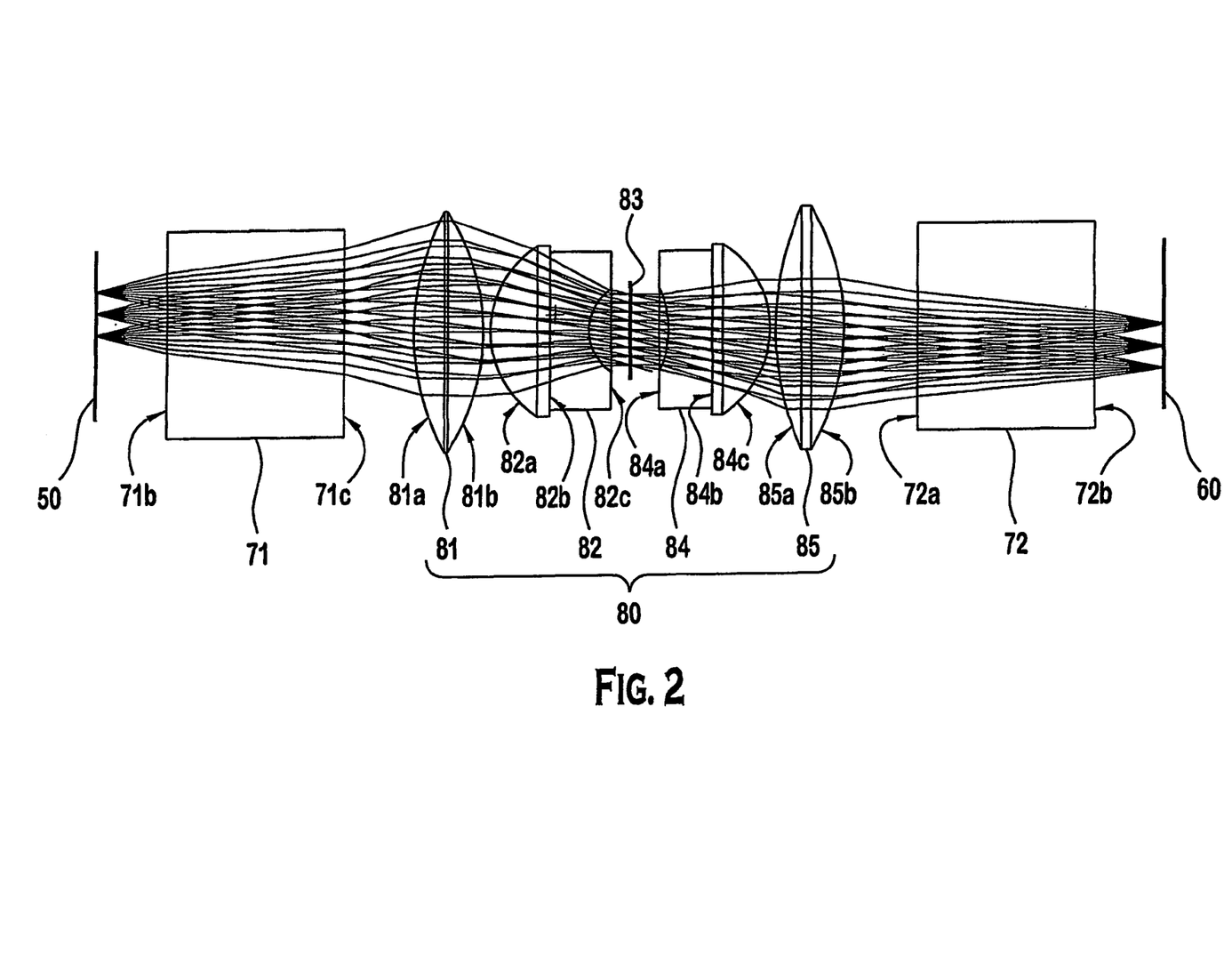
FIG. 2 shows an exemplary lens relay system for the projection system of FIG. 1.

In the exemplary embodiment, illustrated in FIG. 2, first imager 50 is an LCOS imager comprising a matrix of polarized liquid crystals corresponding to the pixels of the display image (not shown). These crystals transmit light according to their orientation, which in turn varies with the strength of an electric field created by a signal provided to the first imager 50. The imager pixels modulate the p-polarized light 3 on a pixel-by-pixel basis proportional to a gray scale value provided to the first imager 50 for each individual pixel. As a result of the modulation of individual pixels, the first imager 50 provides a first light matrix 5, comprising a matrix of pixels or discreet dots of light. First light matrix 5 is an output of modulated s-polarized light reflected from the first imager 50 back through second surface 71b of first PBS 71, where it is reflected by a polarizing surface 71p at an angle out of the first PBS 71 through a third surface 71c. Each pixel of the first light matrix 5 has an intensity or luminance proportional to the individual gray scale value provided for that pixel in first imager 50.

The first light matrix 5 of s-polarized light is reflected by the PBS 71 through a relay lens system 80, which provides 1-to-1 transmission of the first light matrix 5. In an exemplary embodiment, illustrated in FIG. 2, relay lens system 80 comprises a series of aspherical and acromatic lenses configured to provide low distortion of the image being transmitted with a magnification of 1, so that the output of each pixel in the first imager 50 is projected onto a corresponding pixel of the second imager 60.

As shown in FIG. 2, exemplary relay lens system 80 comprises a first aspheric lens 81 and a first acromatic lens 82 between the first PBS 71 and the focal point of the lens system or system stop 83. Between the system stop 83 and the second imager 72, lens system 80 comprises a second acromatic lens 84 and a second aspheric lens 85. First aspheric lens 81 has a first surface 81a and second surface 81b which bend the diverging light pattern from the first PBS 71 into a light pattern converging toward the optical axis of lens system 80. First acromatic lens 82 has a first surface 82a, a second surface 82b, and a third surface 82c, which focus the converging light pattern from the first aspheric lens 81 onto the system stop 83. At the system stop 83, the light pattern inverts and diverges. The second acromatic lens 84, which has a first surface 84a, a second surface 84b, and a third surface 84c, is a mirror image of first acromatic lens 82 (i.e., the same lens turned backward such that first surface 84a of second acromatic lens 84 is equivalent to third surface 82c of first acromatic lens 82 and third surface 84c of second acromatic lens 84 is equivalent to first surface 82a of first acromatic lens 82). The surfaces 84a, 84b, and 84c of second acromatic lens 84 distribute the diverging light pattern onto the second aspherical lens 85. The second aspherical lens 85, which has a first surface 85a and a second surface 85b, is a mirror image of the first aspherical lens 81. Surfaces 85a and 85b bend the light pattern to converge to form an inverted image on the second imager 72 that has a one-to-one correspondence to the object or matrix of pixels from the first imager 50. The surfaces of relay lens system 80 are configured to work with the imagers 50, 60 and PBS's 71, 72 to achieve the one-to-one correspondence of the pixels of first imager 50 and second imager 60. A summary of the surfaces of an exemplary two-stage projection system 30 are provided in Table 1, and aspheric coefficients for surfaces 81a, 81b, 85a, and 85b are provided in Table 2. Various modifications can be made to this exemplary projection system based on such factors as: cost, size, luminance levels, and other design factors. In relay lens system 80 acromatic lenses 82 and 84 are equivalent and aspherical lenses 81 and 85 are equivalent. Therefore, fewer unique parts are required providing manufacturing efficiencies and reduced cost.

TABLE 1

(dimensions in millimeters)

| Device | surface | type | Radius | thickness | glass | diameter | conic |
|---|---|---|---|---|---|---|---|
| 50 | object | std | Infinity | 11.25436 | | | 0 |
| 71 | 2nd (71b) | std | Infinity | 28 | SF2 | 24.07539 | 0 |
| 71 | 3rd (71c) | std | Infinity | 11.44304 | | 29.59782 | 0 |
| 81 | 1st (81a) | evenasph | 45.72373 | 11.60359 | BAK2 | 40 | −0.941321 |
| 81 | 2nd (81b) | evenasph | −29.74398 | 1.061985 | | 40 | −2.300802 |
| 82 | 1st (82a) | std | 16.45201 | 9.507266 | BAK2 | 28 | −0.003454099 |
| 82 | 2nd (82b) | std | 696.8212 | 6.993905 | SF15 | 28 | 0 |
| 82 | 3rd (82c) | std | 10.75055 | 6.389217 | | 14 | 0 |
| 83 | stop | std | Infinity | 6.389217 | | 10.09268 | 0 |
| 84 | 1st (84a) | std | −10.75055 | 6.993905 | SF15 | 14 | 0 |
| 84 | 2nd (84b) | std | −696.8212 | 9.507266 | BAK2 | 28 | 0 |
| 84 | 3rd (84c) | std | −16.45201 | 1.061985 | | 28 | −0.003454099 |
| 85 | 1st (85a) | evenasph | 29.74398 | 11.60359 | BAK2 | 40 | −2.300802 |
| 85 | 2nd (85b) | evenasph | −45.72373 | 11.44304 | | 40 | −0.941321 |
| 72 | 1st (72a) | std | Infinity | 28 | SF2 | 31.9247 | 0 |
| 72 | 2nd (72b) | std | Infinity | 11.25436 | | 25.06428 | 0 |
| 60 | image | std | Infinity | | | 20.44114 | 0 |

TABLE 2

| coefficient on: | surfaces 81a, 85b | surfaces 81b, 85a |
|---|---|---|
| $r^2$ | −2.5672672e−005 | −2.5672139e−005 |
| $r^4$ | −3.6464646e−007 | −4.6458644e−007 |
| $r^6$ | −1.3360629e−009 | −5.3232556e−010 |
| $r^8$ | 2.2079531e−012 | 9.3458426e−013 |
| $r^{10}$ | 4.0274312e−019 | −2.9875722e−019 |
| $r^{12}$ | 3.2408025e−022 | 8.6192792e−022 |
| $r^{14}$ | −4.2302691e−024 | 5.022829e−024 |
| $r^{16}$ | −1.3350251e−026 | 1.9281194e−026 |

After the first light matrix 5 leaves the relay lens system 80, it enters into a second PBS 72 through a first surface 72a. Second PBS 72 has a polarizing surface 72p that reflects the s-polarized first light matrix 5 through a second surface 72b onto a second imager 60. In the exemplary embodiment, illustrated in FIG. 2, second imager 60 is an LCOS imager which modulates the previously modulated first light matrix 5 on a pixel-by-pixel basis proportional to a gray scale value provided to the second imager 60 for each individual pixel. The pixels of the second imager 60 correspond on a one-to-one basis with the pixels of the first imager 50 and with the pixels of the display image. Thus, the input of a particular pixel (i,j) to the second imager 60 is the output from corresponding pixel (i,j) of the first imager 50.

The second imager 60 then produces an output matrix 6 of p-polarized light. Each pixel of light in the output matrix 6 is modulated in intensity by a gray scale value provided to the imager for that pixel of the second imager 60. Thus a specific pixel of the output matrix 6 (i,j) would have an intensity proportional to both the gray scale value for its corresponding pixel $(i,j)_1$ in the first imager and its corresponding pixel $(i,j)_2$ in the second imager 60.

The light output L of a particular pixel (i,j) is given by the product of the light incident on the given pixel of first imager 50, the gray scale value selected for the given pixel at first imager 50, and the gray scale value selected at second imager 60:

$$L = L0 \times G1 \times G2$$

L0 is a constant for a given pixel (being a function of the lamp 10, and the illumination system.) Thus, the light output L is actually determined primarily by the gray scale values selected for this pixel on each imager 50, 60. For example, normalizing the gray scales to 1 maximum and assuming each imager has a very modest contrast ratio of 200:1, then the bright state of a pixel (i,j) is 1, and the dark state of pixel (i,j) is 1/200 (not zero, because of leakage). Thus, the two stage projector architecture has a luminance range of 40,000:1.

$$Lmax = 1 \times 1 = 1;$$

$$Lmin = 0.005 \times 0.005 = 0.000025$$

The luminance range defined by these limits gives a contrast ratio of 1/0.000025:1, or 40,000:1. Importantly, the dark state luminance for the exemplary two-stage projector architecture would be only a forty-thousandth of the luminance of the bright state, rather than one two-hundredth of the bright state if the hypothetical imager were used in an existing single imager architecture. As will be understood by those skilled in the art, an imager with a lower contrast ratio can be provided for a considerably lower cost than an imager with a higher contrast ratio. Thus, a two-stage projection system using two imagers with a contrast ratio of 200:1 will provide a contrast ratio of 40,000:1, while a single-stage projection system using a much more expensive imager with a 500:1 ratio will only provide a 500:1 contrast. Also, a two-stage projection system with one imager having a 500:1 contrast ratio and an inexpensive imager with a 200:1 ratio will have a system contrast ratio of 100,000:1. Accordingly, a cost/performance trade-off can be performed to create an optimum projection system.

Output matrix 6 enters the second PBS 72 through second surface 72b, and since it comprises p-polarized light, it passes through polarizing surface 72p and out of the second PBS 72 through third surface 72c. After output matrix 6 leaves the second PBS 72, it enters the projection lens assembly 40, which projects a display image 7 onto a screen (not shown) for viewing.

Figure 3:
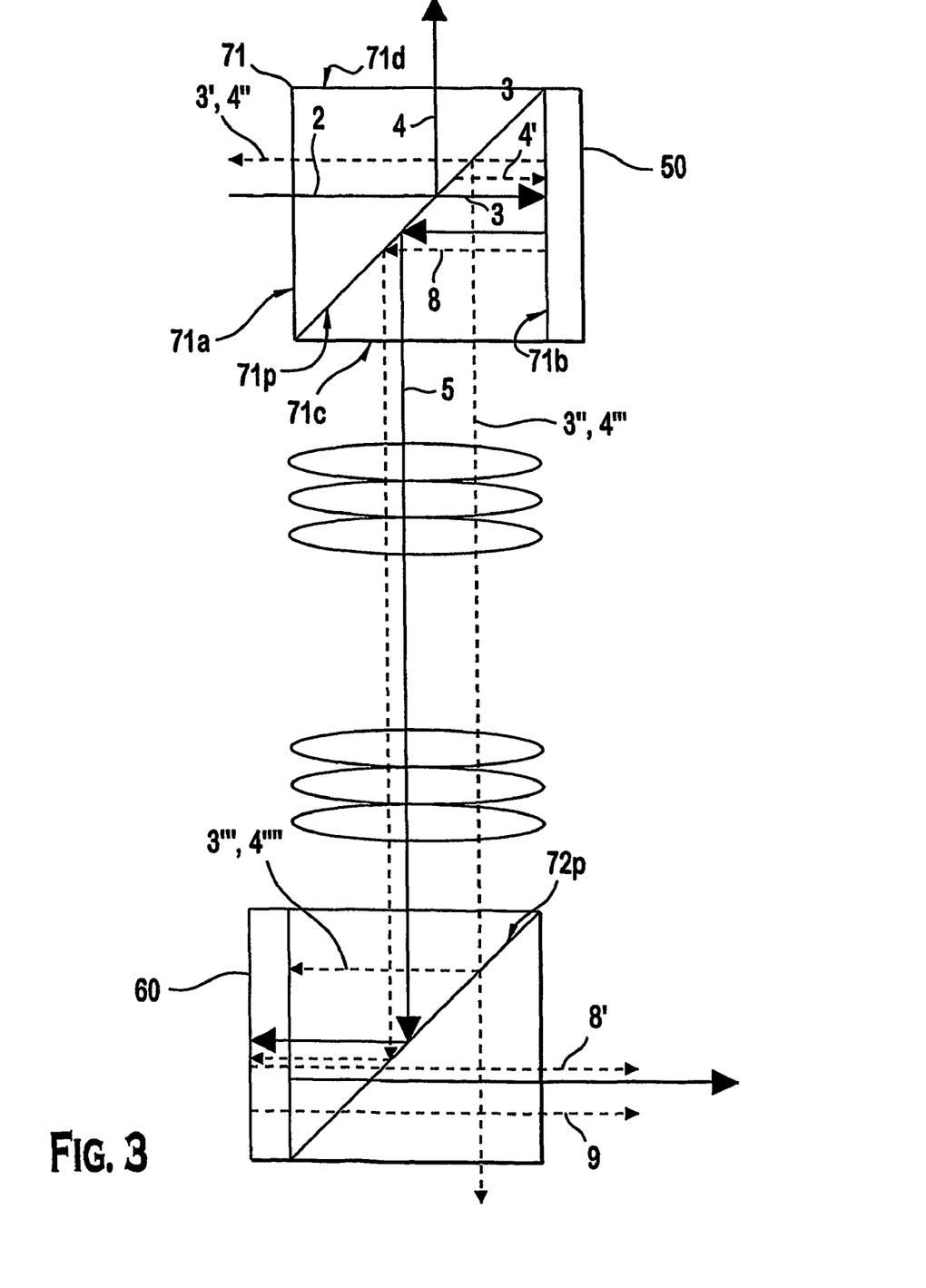
FIG. 3 shows light leakage in the projection system of FIG. 1.

FIG. 3 illustrates the reduced leakage of the two-stage projector architecture of the present invention. As described above, the polarizing surface 71p of first PBS 71 transmits p-polarized light 3, which leaves the first PBS through the second surface 71b. The polarizing surface 71p of first PBS 71 reflects s-polarized light 4 through the fourth surface 71d. Even the best PBS will have some leakage, however, and a very small portion of s-polarized light, first leakage 4', will be transmitted or leak through the polarizing surface 71p of first PBS 71 and out second surface 71b to first imager 50. Most of the first leakage 4' will be inverted by first imager 50 to p-polarized light and pass through polarizing surface 71p and out first surface 71a of first PBS 71 toward light 10. Similarly, a small portion of p-polarized light 3 will be reflected by first imager 50, as p-polarized second leakage 3'. Since second leakage 3' is p-polarized light, most of it will pass back through the polarizing surface 71p of first PBS 71 and out first surface 71a toward light 10.

A small portion of p-polarized first leakage 3' and p-polarized second leakage 4" will be reflected by polarizing surface 71p of PBS 1 toward second PBS 72 as fourth leakage 3", 4'''. Most of this third leakage 3", 4''' will pass through the polarizing surface 72p of second PBS 72 and away from the image path through fourth surface 72d, because it is p-polarized light. A small portion of third leakage 3", 4''' will be reflected onto second imager 60 as fourth leakage 3''', 4''''. Most of the fourth leakage 3''', 4'''' will be inverted to s-polarized light and get reflected back toward first PBS 71. As one skilled in the art will appreciate, each subsequent time that a light leakage through a PBS or reflection is transmitted through a PBS 71, 72, most of the light leakage is diverted from the image path, such that only a portion of the previous portion continues along the image path. Thus, each time a light signal passes through a PBS, inverted polarized leakage is reduced.

As with the PBS, no imager is perfect, and a small portion of light will be reflected as s-polarized fifth leakage 8 by pixels of the first imager 50 with a gray scale value set to the dark state. In sharp contrast to the p-polarized fourth leakage, most of the s-polarized fifth leakage 8 will be reflected by polarizing surface 71p and polarizing surface 72p onto second imager 60, because it has the same polarization as first light matrix 5. When the corresponding pixel of the second imager 60 is set to the dark state, the fifth leakage 8 is further reduced by the contrast ratio of second imager 60 as described above, reducing the light in the dark state to sixth leakage 8' and enhancing the contrast ratio.

Additional light leakage 9 occurs at the second imager 60. This additional light leakage 9, however is from the first light matrix 5, previously modulated by first imager 71, and would therefore be a portion of a much smaller light signal than the RGB bands 3 incident on the first imager 71. Accordingly, the two-stage projection architecture of the present invention reduces leakage, both through additional polarized filtering and through cumulative contrast ratios of serial imagers 50, 60.

Another advantage of the two-stage projector system according to the present invention is that a larger number of bits are available to describe subtle differences in shading in darker areas of the image, reducing contouring. For example, if eight bits are used to produce a gray scale value for each pixel of an imager, then $2^8$ or 256 shades of gray can be defined. Because two imagers 50, 60 modulate the same pixel of an image sequentially in the present invention, however, $2^{16}$ or 65,536 shades of gray can be defined. Thus contouring can be greatly reduced.

Figure 4:
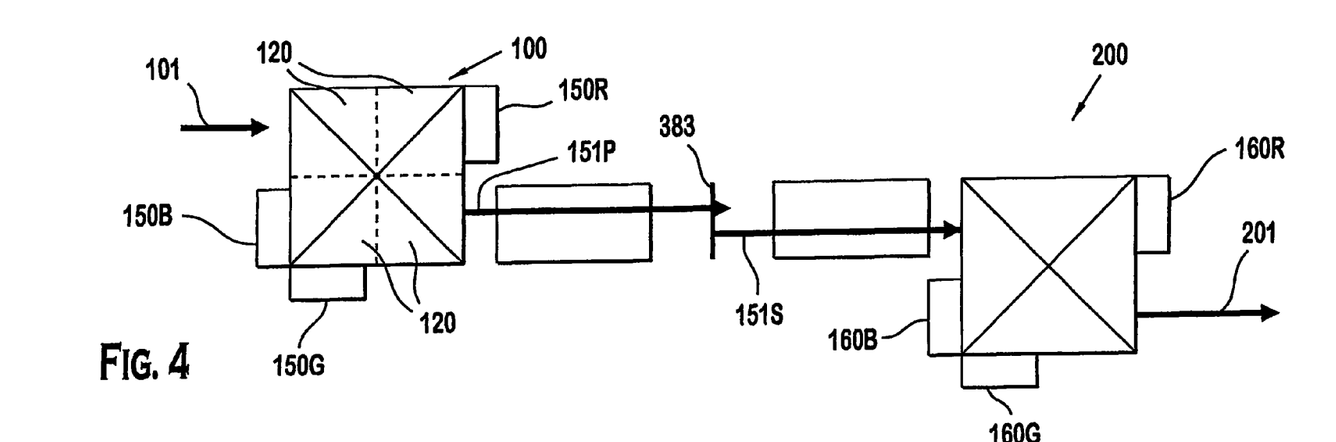
FIG. 4 shows a block diagram of an LCOS projection system with a two-stage. projection architecture according to an alternative exemplary embodiment of the invention.
Figure 5:
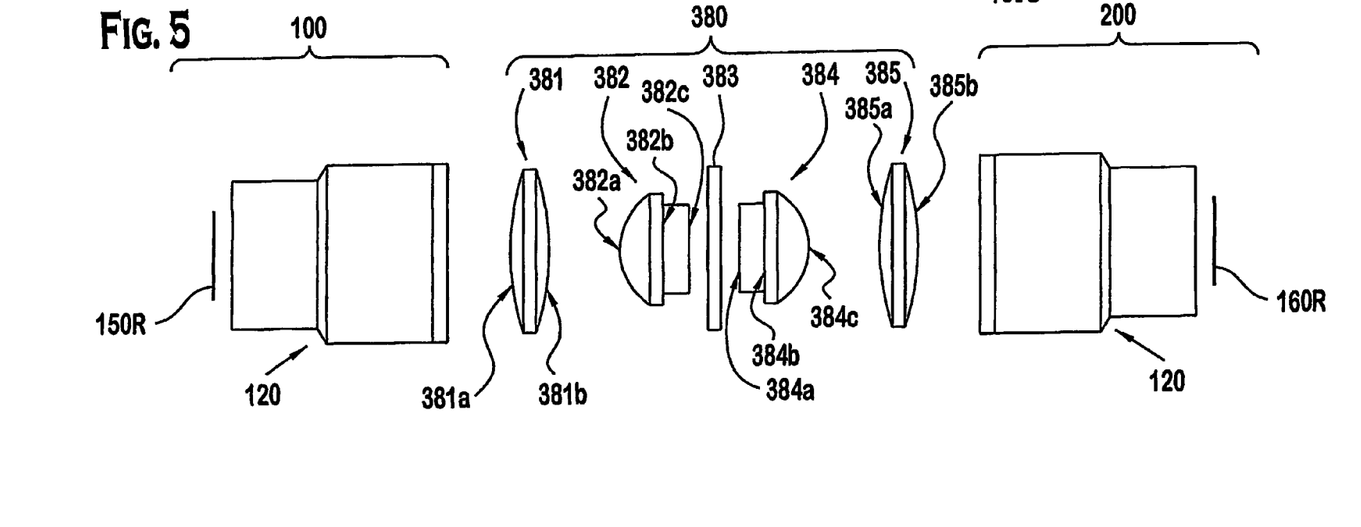
FIG. 5 shows an exemplary relay lens system for the projection system of FIG. 4.

In an alternative embodiment of the invention, as shown in FIGS. 4 and 5, a two stage projection system comprises a first stage 100 having three first stage imagers 150R, 150B and 150G for modulating red, green, and blue light, respectively, on as pixel-by-pixel basis. Each first stage imager 150R, 150B, 150G provides a matrix of modulated monochromatic light pixels 151P. The fist stage imagers rotate the polarization of the light so that the output matrices 151P are p-polarized light. In the illustrated embodiment, the first stage 100 is configured in a COLORQUAD™ architecture, wherein four color-selective beam splitters 120 are abutted to form a square pattern and arranged such that they selectively pass or reflect various colors of light so that each color of light entering the first stage 100 is directed to a different first stage imager 150R, 150B, 150G. The COLORQUAD™ architecture directs only red light to the red imager 150R, only blue light to the blue imager 150B, and only green light to the green imager 150G. The COLORQUAD™ architecture then directs the three matrices 151P of modulated monochromatic light pixels out of the first stage 100 toward a second stage 200. It should be noted that the various colors of light each travel the same distance in the first stage 100. Thus the three colors can be modulated and projected simultaneously.

The embodiment illustrated in FIG. 4, also comprises a second stage 160 having three second stage imagers 160R, 160B, 160G arranged in a COLORQUAD™ architecture, which again divides light into three different colors: red, blue and green and directs them to the three second stage imagers 160R, 160B, 160G. The second stage imagers 160R, 160B, 160G modulate light output from the first stage imagers 150R, 150B, 150G on as pixel-by-pixel basis, to form twice modulated matrices of monochromatic light pixels 201. These twice modulated matrices of monochromatic light pixels 201 are directed by the COLORQUAD™ architecture into a projection lens system (not shown) which projects them onto a screen (not shown) to form a viewable color image.

An alterative exemplary relay lens system 380 is disposed between the first stage 150 and the second stage 160 to project the output of the pixels of the first stage imagers 150R, 150B, 150G onto corresponding pixels of the second stage imagers 160R, 160b, 160G, such that a particular pixel of the output of the second stage will comprise a red pixel, a blue pixel and a green pixel, each being modulated twice (once by a first stage imager 150R, 150B, 150G and once by a corresponding second stage imager 160R, 160B, 160G).

The COLORQUAD™ architecture should receive only s-polarized light. Accordingly, s-polarixed light 101 is introduced into the first stage 100, where the s-polarized light 101 is divided into three colors which are individually and simultaneously modulated by the three imagers 150R, 150B, and 150G. Since the COLORQUAD™ architecture of the second stage 200 should receive s-polarized input, and the matrices of modulated monochromatic pixels of light 151 from the first stage 100 is p-polarized light, the polarization must be rotated between the first stage 100 and the second stage 200. Accordingly, a half-wave plate 383 is disposed between the first stage 100 and the second stage 200 in the embodiment illustrated in FIGS. 4 and 5. The most effective location for the half-wave plate 383 is at the aperture or lens stop of the relay lens system.

As shown in FIG. 5, the alternate exemplary relay lens system 380 comprises a first aspheric lens 381 and a first acromatic lens 382 between the first stage 100 and the lens stop or system stop. Between the system stop and the second stage 200, the alternative exemplary lens system 380 comprises a second acromatic lens 384 and a second aspheric lens 385. First aspheric lens 381 has a first surface 381a and second surface 381b which bend the diverging light pattern from the first stage 100 into a light pattern converging toward the optical axis of lens system 380. First acromatic lens 382 has a first surface 382a, a second surface 382b, and a third surface 382c, which focus the converging light pattern from the first aspheric lens 381 onto the system stop. At the system stop, the light pattern inverts and diverges. The second acromatic lens 384, which has a first surface 384a, a second surface 384b, and a third surface 384c, has the same configuration but an opposite orientation of first acromatic lens 382 (i.e., the same lens turned backward such that first surface 384a of second acromatic lens 384 is equivalent to third surface 382c of first acromatic lens 382 and third surface 384c of second acromatic lens 384 is equivalent to first surface 382a of first acromatic lens 382). The surfaces 384a, 384b, and 384c of second acromatic lens 384 distribute the diverging light pattern onto the second aspherical lens 385. The second aspherical lens 385, which has a first surface 385a and a second surface 385b, has the same configuration, but opposite orientation of the first aspherical lens 381. Surfaces 385a and 385b bend the light pattern to converge to form an inverted image on the second stage 200 that has a one-to-one correspondence to the object or matrix of pixels from the first stage 100. The surfaces of relay lens system 380 are configured to work with the imagers 150R, 150B, 150G, 160R, 160B, 160G and COLORQUAD™ architecture to achieve the one-to-one correspondence of the pixels of first stage imagers 150R, 150B, 150G and the second imager 160R, 160B, 160G. A summary of the surfaces of an alternative exemplary relay lens system 380 is provided in Table 3, and aspheric coefficients for surfaces 381a, 381b, 385a, and 385b are provided in Table 4. While red imagers 150R and 160R are shown, the relay lens system is the same for the blue and green imagers. Various modifications can be made to this alternative exemplary relay lens system 380 based on such factors as: cost, size, luminance levels, and other design factors. In alternative exemplary relay lens system 380, acromatic lenses 382 and 384 are equivalent and aspherical lenses 381 and 385 are equivalent. Therefore, fewer unique parts are required providing manufacturing efficiencies and reduced cost.

TABLE 3

(dimensions in millimeters)

| Surface | Type | Radius | Thickness | Glass | Diameter | Conic |
|---|---|---|---|---|---|---|
| 150R | Standard | Infinity | 5 | | 20.4 | 0 |
| 120 | Standard | Infinity | 22 | SF2 | 35.6 | 0 |
| 120 | Standard | Infinity | 2.01 | BK7 | 35.6 | 0 |
| 120 | Standard | Infinity | 27 | SF2 | 43.42 | 0 |
| 120 | Standard | Infinity | 3.39 | BK7 | 43.42 | 0 |
| 120 | Standard | Infinity | 15.35734 | | 34.44785 | 0 |
| 381a | Evenasph | 54.31735 | 11.64581 | BAK2 | 41.60527 | −.300586 |
| 381b | Evenasph | −53.66137 | 16.97665 | | 41.49939 | −2.189343 |
| 382a | Standard | 16.10644 | 10.20515 | BAK2 | 28.1681 | −0.03218522 |
| 382b | Standard | 51.12306 | 4.214673 | SF15 | 23.92413 | 0 |
| 382c | Standard | 12.39113 | 9.160193 | | 16.74992 | 0.3226084 |
| STO | Standard | Infinity | 1.1 | BK7 | 13.61922 | 0 |
| 383 | Standard | Infinity | 9.160193 | | 14.0642 | 0 |
| 384a | Standard | −12.39113 | 4.214673 | SF15 | 16.74992 | 0.3226084 |
| 384b | Standard | −51.12306 | 10.20515 | BAK2 | 23.92413 | 0 |
| 384c | Standard | −16.10644 | 16.97665 | | 28.16813 | −0.03218522 |
| 385a | Evenasph | 53.66137 | 11.64581 | BAK2 | 41.49939 | −2.189343 |
| 385b | Evenasph | −54.31735 | 15.35734 | | 41.60527 | −1.300586 |
| 120 | Standard | Infinity | 3.39 | BK7 | 34.44785 | 0 |
| 120 | Standard | Infinity | 27 | SF2 | 43.42 | 0 |
| 120 | Standard | Infinity | 2.01 | BK7 | 43.42 | 0 |
| 120 | Standard | Infinity | 22 | SF2 | 35.6 | 0 |
| 120 | Standard | Infinity | 5 | | 35.6 | 0 |
| 160R | Standard | Infinity | | | 20.4 | 0 |

TABLE 4

| Coefficient on: | Surface 381a: Evenasph | Surface 381b: Evenasph | Surface 385a: Evenasph | Surface 385b: Evenasph |
|---|---|---|---|---|
| $r^2$ | 7.2863779e−005 | 6.5067317e−005 | 6.5067317e−005 | 7.2863779e−005 |
| $r^4$ | 3.8342926e−007 | 3.7276989e−007 | 3.7276989e−007 | 3.8342926e−007 |
| $r^6$ | −1.6715824e−009 | −1.3168408e−009 | −1.3168408e−009 | −1.6715824e−009 |
| $r^8$ | 6.3658429e−012 | 2.828627e−012 | 2.828627e−012 | 6.3658429e−012 |
| $r^{10}$ | −2.3418598e−015 | 1.0954082e−014 | 1.0954082e−014 | −2.3418598e−015 |
| $r^{12}$ | −2.1109997e−018 | −9.2267507e−019 | −9.2267507e−019 | −2.1109997e−018 |
| $r^{14}$ | 3.4975822e−020 | −6.4427989e−020 | −6.4427989e−020 | 3.4975822e−020 |
| $r^{16}$ | −1.2083771e−022 | 1.723144e−023 | 1.723144e−023 | −1.2083771e−022 |

Figure 6:
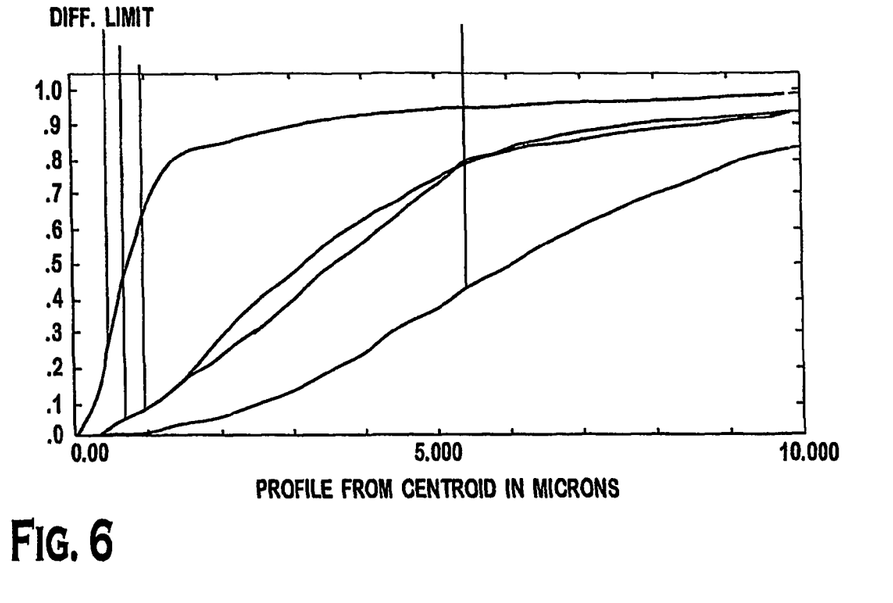
FIG. 6 shows the calculated ensquared energy for the relay lens system of FIG. 5.
Figure 7:
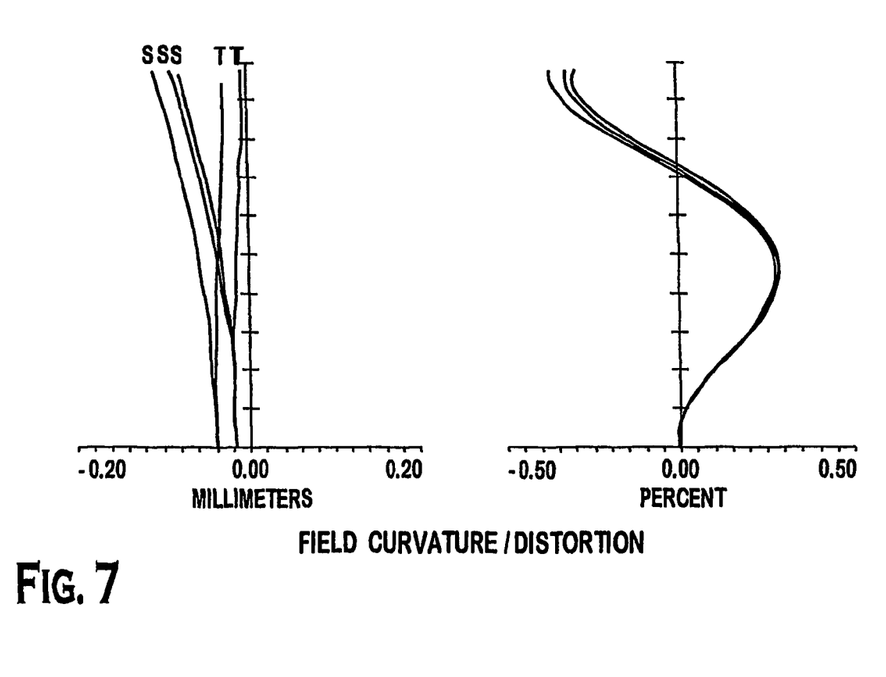
FIG. 7 shows the distortion due to field curvature for the relay lens system of FIG. 5.

The ensquared energy and field curvature distortion were calculated for the alternative exemplary relay lens system 380 using ZEMAX™ software. As shown in FIG. 6, at least about fifty percent (50%) of the light energy from a particular pixel on a first stage imager 150R, 150B, 150G is focused onto a twelve micron square (e.g., the corresponding pixel of a second stage imager 160R, 160B, 160G). As shown in FIG. 7, the distortion due to field curvature of the alternative exemplary relay system 380 is less than about 0.5 percent.

The foregoing illustrates some of the possibilities for practicing the invention. Many other embodiments are possible within the scope and spirit of the invention. For example, while the forgoing description and the Figures are directed to an LCOS imager, a similar system using a digital light processing (DLP) imager is also contemplated within the scope of the invention. It is, therefore, intended that the foregoing description be regarded as illustrative rather than limiting, and that the scope of the invention is given by the appended claims together with their full range of equivalents.

What is claimed is:

1. A two-stage projection system comprising:
   a first stage having one or more imagers for modulating light on a pixel-by-pixel basis;
   a second stage having one or more imagers for modulating light on a pixel-by-pixel basis;
   a relay lens system projecting the output of the pixels of the first stage imagers onto corresponding pixels of the second stage imagers; and
   a half-wave plate disposed between the first stage and the second stage.

2. The two-stage imager of claim 1 wherein the first stage comprises three imagers for modulating red, blue, and green light, respectively and an architecture configured to direct light of the desired color to each imager.

3. The two-stage imager of claim 2 wherein the second stage comprises three imagers for modulating red, blue, and green light, respectively and an architecture configured to direct light of the desired color to each imager.

4. The two-stage imager of claim 1 wherein the half-wave plate is disposed at the system stop of the relay lens system.

5. The two-stage imager of claim 1 wherein the relay lens system ensquares at least about 50 percent of the energy from a particular pixel of a first stage imager onto the corresponding pixel of a second stage imager.

6. The two-stage imager of claim 1 wherein the relay lens system provides a distortion due to field curvature of less than about 0.5 percent.

* * * * *